United States Patent
Chen

(10) Patent No.: US 8,602,705 B2
(45) Date of Patent: Dec. 10, 2013

(54) SCREW ASSEMBLY

(75) Inventor: Yun-Lung Chen, New Taipei (TW)

(73) Assignee: Hon Hai Precision Industry Co., Ltd., New Taipei (TW)

(*) Notice: Subject to any disclaimer, the term of this patent is extended or adjusted under 35 U.S.C. 154(b) by 35 days.

(21) Appl. No.: 13/444,093

(22) Filed: Apr. 11, 2012

(65) Prior Publication Data

US 2013/0017034 A1    Jan. 17, 2013

(30) Foreign Application Priority Data

Jul. 14, 2011  (CN) .......................... 2011 1 0196976

(51) Int. Cl.
*F16B 43/00*    (2006.01)
(52) U.S. Cl.
USPC .......................... 411/372; 411/371.2; 411/999
(58) Field of Classification Search
USPC .............. 411/371.2, 372, 533, 548, 974, 999, 411/400, 402–403, 410
See application file for complete search history.

(56) References Cited

U.S. PATENT DOCUMENTS

| | | | | |
|---|---|---|---|---|
| 3,297,293 A | * | 1/1967 | Andrews et al. | 248/499 |
| 4,431,352 A | * | 2/1984 | Andrews | 410/101 |
| 4,570,987 A | * | 2/1986 | Wong et al. | 294/215 |
| 4,641,986 A | * | 2/1987 | Tsui et al. | 403/164 |
| 4,863,205 A | * | 9/1989 | Schron et al. | 294/82.28 |
| 5,352,056 A | * | 10/1994 | Chandler | 403/79 |
| 6,953,212 B2 | * | 10/2005 | Alba | 294/217 |
| 6,994,501 B2 | * | 2/2006 | Smetz | 411/400 |

* cited by examiner

Primary Examiner — Roberta Delisle
(74) Attorney, Agent, or Firm — Altis Law Group, Inc.

(57) ABSTRACT

A screw assembly includes a screw member, a rotating member, and an installation member. The screw member includes a cap portion and a body connected to the cap portion. The installation member defines an installation slot and includes an elastically deformable latching portion. The rotating member includes a mounting portion. The installation member is secured to the body, the mounting portion is received in the installation slot, and the elastically deformable latching portion engages the mounting portion between the cap portion and the latching portion, to prevent the rotating member from rotating relative to the screw member and the installation member.

20 Claims, 4 Drawing Sheets

SCREW ASSEMBLY

BACKGROUND

1. Technical Field

The present disclosure relates to a screw assembly.

2. Description of Related Art

A screw is generally used for securing a first object to a second object. When the first object needs to be disassembled from the second object, a tool is required for disengaging the screw, which can be inconvenient.

Therefore, there is room for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
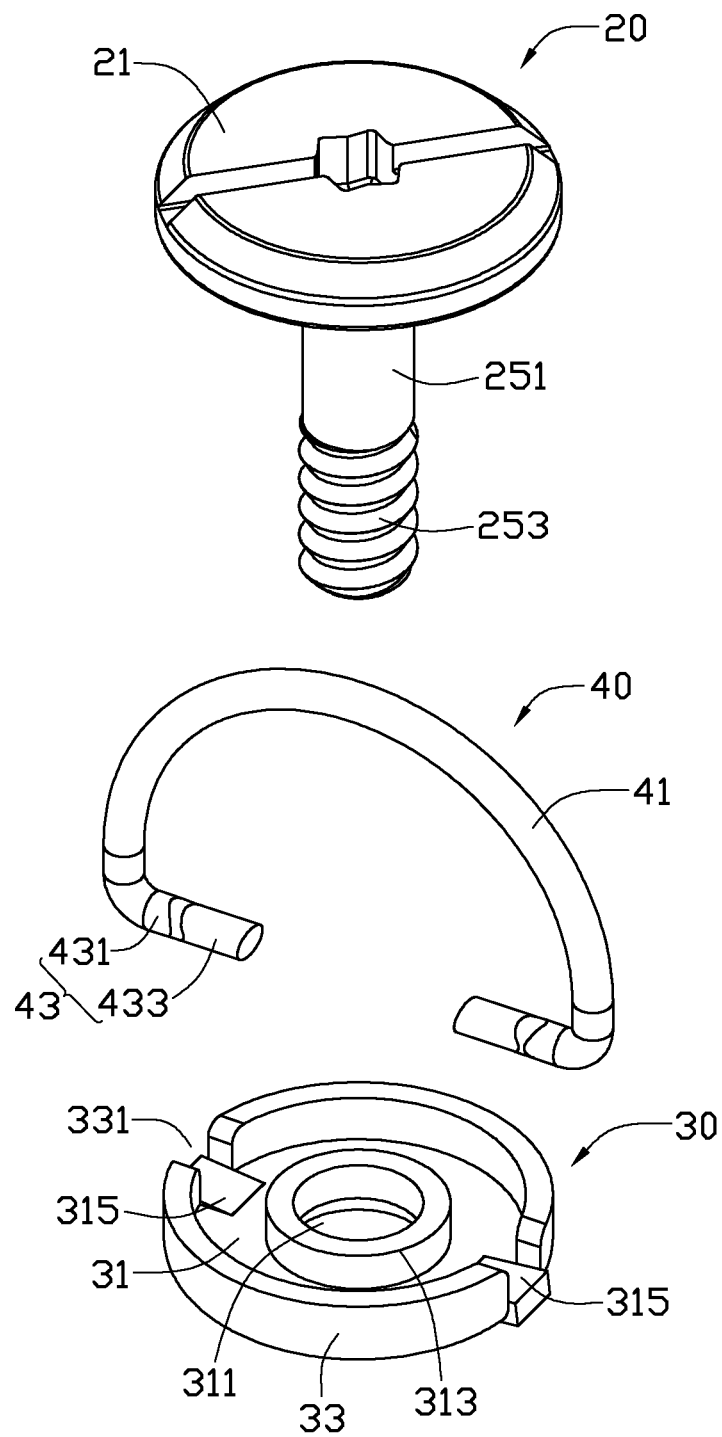
FIG. 1 is an exploded, isometric view of an embodiment of a screw assembly.
Figure 2:
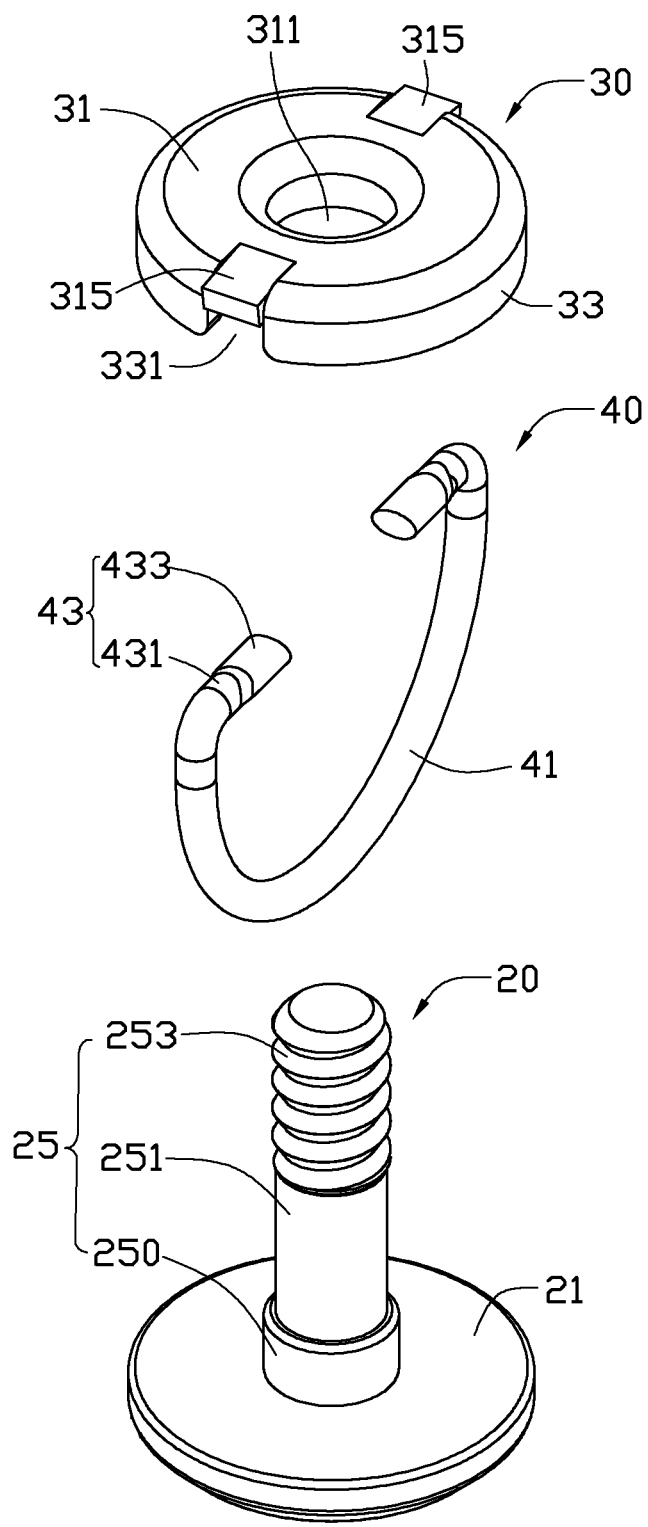
FIG. 2 is similar to FIG. 1, but viewed from a different aspect.

FIG. 1 and FIG. 2, are a screw assembly in accordance with an embodiment including a screw member 20, an installation member 30, and a rotating member 40. The installation member 30 can be secured to the screw member 20. The rotating member 40 can be rotatably mounted to the installation member 30.

The screw member 20 includes a cap portion 21, and a body 25 extending from the cap portion 21. The body 25 includes a positioning portion 250, a connecting portion 251, and a threaded portion 253. In one embodiment, a cross-section of the body 25 is round. The positioning portion 250 is connected to the cap portion 21 and can be secured to the installation member 30. The connecting portion 251 is located between the positioning portion 250 and the threaded portion 253. In one embodiment, a diameter of the positioning portion 250 is larger than a diameter of the connecting portion 251. A diameter of the threaded portion 253 is substantially equal to a diameter of the connecting portion 251.

The installation member 30 includes a maintaining piece 31 and a flange 33. The maintaining piece 31 includes a top surface and a bottom surface opposite to the top surface. The flange 33 extends from the top surface of the maintaining piece 31. The maintaining piece 31 defines a through hole 311. An installation portion 313 extends from edges of the through hole 311. An extending direction of the installation portion 313 is substantially parallel to the extending direction of the flange 33. The flange 33 defines two installation slots 331. Two latching portions 315 obliquely extend from the maintaining piece 31. Each latching portion 315 is located in the installation slot 331 and extends out of the flange 33. In one embodiment, the through hole 311 is round.

The rotating member 40 includes an operating portion 41 and two mounting portions 43, extending from two opposite ends of the operating portion 41. Extending directions of the two mounting portions 43 are substantially opposite to each other. In one embodiment, the operating portion 41 is curved. Each of the two mounting portions 43 includes a connecting end 431 and a mounting end 433 connected to the connecting end 431. The connecting end 431 is connected to the operating portion 41. In one embodiment, a longitudinal-section of the mounting end 433 is an ellipse.

Figure 3:
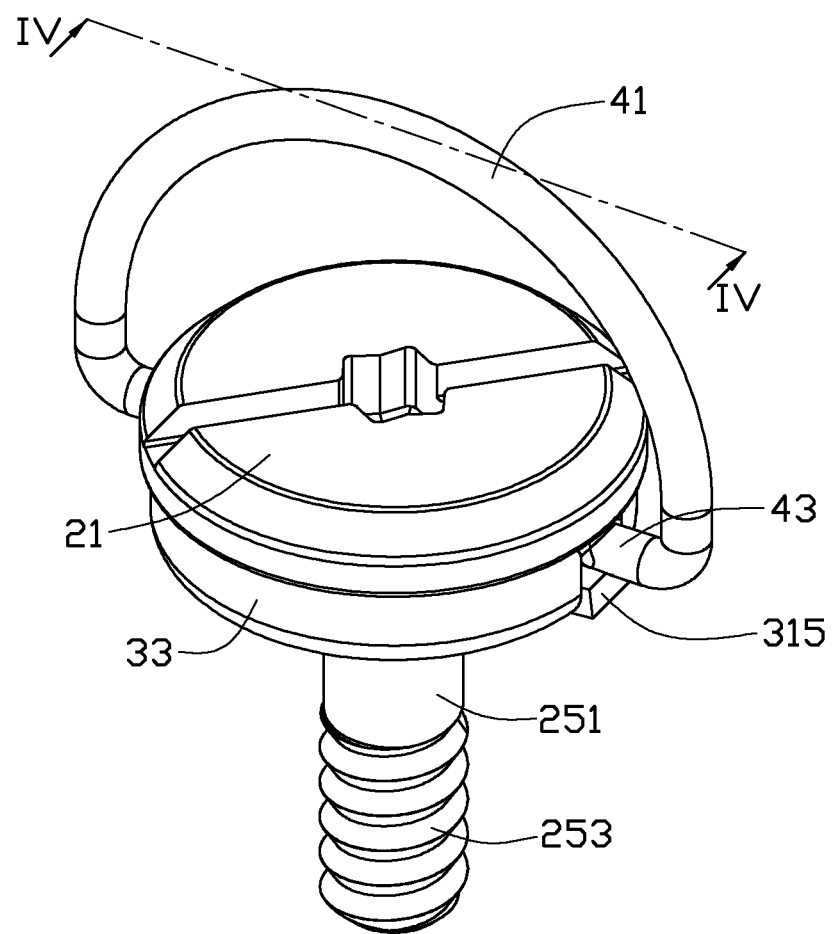
FIG. 3 is an assembled, isometric view of the screw assembly of FIG. 1.
Figure 4:
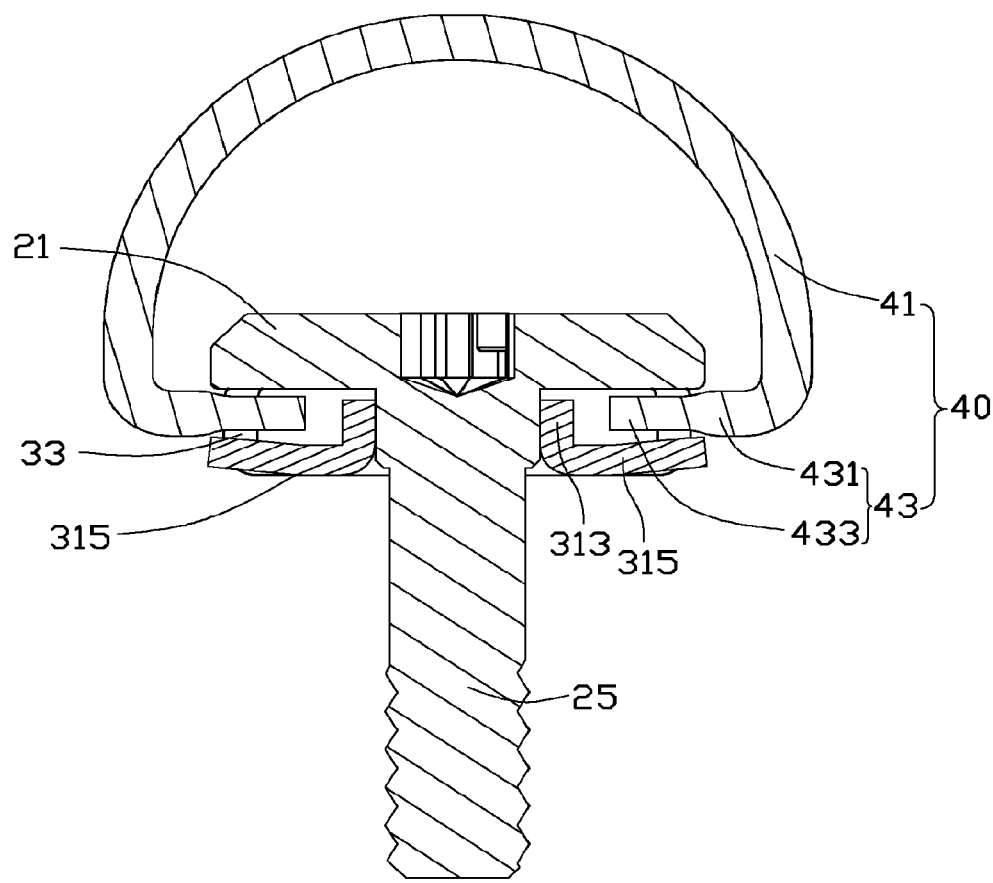
FIG. 4 is a cross-sectional view of FIG. 3 taken along the line IV-IV.

FIGS. 2-4, shown in assembly, the installation portion 313 faces the body 25, and the installation member 30 is moved towards the screw member 20. The body 25 is inserted in the through hole 311. Each of the two mounting portions 43 is located in each of the two installation slots 331. The installation member 30 is pressed towards the screw member 20, and the latching portion 315 is elastically deformed, until the positioning portion 250 is secured to the through hole 311 and the flange 33 abuts the cap portion 21. The through hole 311 receives the positioning portion 250, and there is an interference fit between the through hole 311 and the positioning portion 250. The latching portion 315 exerts elastic force to engage the mounting end 433 to the installation slot 331, to prevent the mounting end 433 from rotating in the installation slot 331 freely. In one embodiment, the installation member 30 is made of nylon.

The screw assembly is capable of being locked into a threaded hole of an object (not shown). In use, the body 25 is aligned with the threaded hole and inserted into the threaded hole. The operating portion 41 is rotated along a first direction relative to the object. The body 25 is rotated by the operating portion 41 along the first direction together with the operating portion 41, so that the body 25 is secured to the threaded hole. The operating portion 41 is rotated along a second direction opposite to the first direction, and the body 25 can be rotated out of the threaded hole.

The rotating member 40 is capable of being rotated relative to the screw member 20 in the installation slot 331. The latching portion 315 exerts elastic force to the rotating member 40 and allows the rotating member 40 to be positioned in any one position when the rotating member 40 is rotated.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A screw assembly comprising:
   a screw member comprising a cap portion, and a body connected to the cap portion;
   an installation member, defining an installation slot, comprising an elastically deformable latching portion; and
   a rotating member comprising a mounting portion, the mounting portion comprises a mounting end and a connecting end connected to the mounting end;
   wherein a longitudinal-section of the mounting end is elliptically-shaped; the installation member is secured to the body, the mounting portion is received in the installation slot, and the elastically deformable latching portion engages the mounting end between the cap portion and the elastically deformable latching portion, to prevent the rotating member from freely rotating relative to the screw member and the installation member.

2. The screw assembly of claim 1, wherein the installation member comprises a maintaining piece and a flange extending from the maintaining piece, the installation slot is defined in the flange, and the latching portion extends from the maintaining piece.

3. The screw assembly of claim 2, wherein the latching portion is oblique relative to the maintaining piece, and the latching portion is located on the installation slot and extends out of the flange.

4. The screw assembly of claim 1, wherein the mounting portion is capable of being rotated in the installation slot and positioned in any one position by the latching portion.

5. The screw assembly of claim 1, wherein the body comprises a positioning portion, a connecting portion and a threaded portion, and the connecting portion is connected between the positioning portion and the threaded portion; and the installation member defines a through hole, the threaded portion extends out of the through hole, and the positioning portion is secured in the through hole.

6. The screw assembly of claim 5, wherein the installation member further comprises an installation portion extending from edges of the through hole, and the positioning portion is received in the installation portion.

7. The screw assembly of claim 6, wherein the installation portion engages with the positioning portion, and there is an interference fit between the installation portion and the positioning portion.

8. The screw assembly of claim 5, wherein the rotating member further comprises an operating portion, the operating portion is operable to rotate the screw member, and the mounting portion extends from the operating portion.

9. The screw assembly of claim 8, wherein the connecting end is connected to the operating portion, and the mounting end is received in the installation slot.

10. The screw assembly of claim 8, wherein the operating portion is curved.

11. A screw assembly adapted to be locked into a threaded hole of an object, comprising:
    a screw member comprising a cap portion, and a body connected to the cap portion;
    an installation member, defining an installation slot, comprising an elastically deformable latching portion; and
    a rotating member comprising a mounting portion, the mounting portion comprises a mounting end and a connecting end connected to the mounting end;
    wherein a longitudinal-section of the mounting end is elliptically-shaped; the installation member is secured to the body, the mounting end rotatably received in the installation slot, and the elastically deformable latching portion engages the mounting end between the cap portion and the elastically deformable latching portion; the rotating member is rotatable relative to the object along a first direction, and the rotating member is rotatable relative to the screw member along a second direction different from the first direction by elastically deforming the latching portion through the mounting end.

12. The screw assembly of claim 11, wherein the installation member comprises a maintaining piece and a flange extending from the maintaining piece, the installation slot is defined in the flange, and the latching portion extends from the maintaining piece.

13. The screw assembly of claim 12, wherein the latching portion is oblique relative to the maintaining piece, and the latching portion is located on the installation slot and extends out of the flange.

14. The screw assembly of claim 11, wherein the mounting portion is capable of being rotated in the installation slot and positioned in any one position by the latching portion.

15. The screw assembly of claim 11, wherein the body comprises a positioning portion, a connecting portion and a threaded portion, and the connecting portion is connected between the positioning portion and the threaded portion; the installation member defines a through hole; the threaded portion is inserted out of the through hole; and the positioning portion is secured in the through hole.

16. The screw assembly of claim 15, wherein the installation member further comprises an installation portion extending from edges of the through hole; and the positioning portion is received in the installation portion.

17. The screw assembly of claim 16, wherein the installation portion engages with the positioning portion, and there is an interference fit between the installation portion and the positioning portion.

18. The screw assembly of claim 15, wherein the rotating member further comprises an operating portion, the operating portion is operable to rotate the screw member, and the mounting portion extends from the operating portion.

19. The screw assembly of claim 18, wherein the mounting portion comprises a connecting end connected to the operating portion, and a mounting end connected to the connecting portion; and the mounting end is received in the installation slot, and the mounting portion is ellipse.

20. The screw assembly of claim 18, wherein the operating portion is curved.

* * * * *